(12) United States Patent
Gebhardt et al.

(10) Patent No.: US 11,030,518 B2
(45) Date of Patent: Jun. 8, 2021

(54) ASYNCHRONOUS ARTIFICIAL NEURAL NETWORK ARCHITECTURE

(71) Applicant: The United States of America as represented by the Secretary of the Navy, San Diego, CA (US)

(72) Inventors: Daniel J Gebhardt, San Diego, CA (US); Benjamin J Migliori, San Diego, CA (US); Michael W Walton, San Diego, CA (US); Logan Straatemeier, San Diego, CA (US); Maurice R Ayache, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 625 days.

(21) Appl. No.: 16/007,735

(22) Filed: Jun. 13, 2018

(65) Prior Publication Data

US 2019/0385041 A1   Dec. 19, 2019

(51) Int. Cl.
*G06N 3/04* (2006.01)
*G06N 3/063* (2006.01)

(52) U.S. Cl.
CPC ............ *G06N 3/0481* (2013.01); *G06N 3/04* (2013.01); *G06N 3/049* (2013.01); *G06N 3/063* (2013.01)

(58) Field of Classification Search
CPC ........ G06N 3/04; G06N 3/0481; G06N 3/049; G06N 3/063
See application file for complete search history.

(56) References Cited

U.S. PATENT DOCUMENTS

| 5,742,739 A * | 4/1998 | Albesano ............... G06N 3/063 706/14 |
| 10,460,175 B1 * | 10/2019 | Gould .................. G06N 3/0454 |
| 10,949,737 B2 * | 3/2021 | Lee ...................... G06N 3/0445 |
| 2015/0269481 A1 * | 9/2015 | Annapureddy ........ G06N 3/049 706/21 |
| 2017/0286774 A1 | 10/2017 | Gaidon |
| 2017/0293804 A1 | 10/2017 | Min et al. |

(Continued)

OTHER PUBLICATIONS

Downs, Justin "Multi-frame convolutional neural networks for object detection in temporal data," NPS Archive: Calhoun, Mar. 2017.

(Continued)

*Primary Examiner* — Stanley K. Hill
(74) *Attorney, Agent, or Firm* — Naval Information Warfare Center, Pacific; Kyle Eppele; Elliott J. Deaderick

(57) ABSTRACT

An asynchronous convolutional neural network (CNN) can interpret a sequence of input data. An input value representing a sample of the sequence of input data is received by a computational unit (CU) in a layer of the asynchronous CNN. The CU calculates a dot product of the input value and a weight assigned to the CU to produce an activation value. A change detector (CD) associated with the CU detects a difference between the activation value and previous activation values. The CD determines whether the detected difference is significant, indicating that the sample of the sequence of input data includes a significant change. If the detected difference is significant, the activation value is supplied to at least one subsequent CU included in a subsequent layer of the asynchronous CNN.

20 Claims, 3 Drawing Sheets

(56) References Cited

U.S. PATENT DOCUMENTS

2017/0351936 A1 12/2017 Jiang
2018/0121791 A1* 5/2018 O'Connor .............. G06N 3/049

OTHER PUBLICATIONS

Karpathy, Andraj et al., "Large-scale Video Classification with Convolutional Neural Networks," Computer Vision Foundation, 2014.
Liang, Ming et al., "Recurrent Convolutional Neural Network for Object Recognition," Computer Vision Foundation, 2015.

* cited by examiner

ASYNCHRONOUS ARTIFICIAL NEURAL NETWORK ARCHITECTURE

FEDERALLY-SPONSORED RESEARCH AND DEVELOPMENT

The United States Government has ownership rights in the subject matter of the present disclosure. Licensing inquiries may be directed to the Office of Research and Technical Applications, Space and Naval Warfare Systems Center Pacific, Code 72120, San Diego, Calif. 92152. Telephone: (619) 553-5118; email: ssc_pac_t2@navy.mil. Reference Navy Case 105686.

BACKGROUND

The present disclosure pertains generally to interpreting sequences of input data including interpreting sequences of input data using an asynchronous artificial neural network (ANN).

ANNs, such as convolutional neural networks (CNNs), are often used to interpret sequences of input data, such as a sensory sequence of input data. As one example, CNNs are commonly used for detection of objects in video frames.

ANNs require many arithmetic computations to yield a result, which can limit their use. Additionally, inputs into ANNs are often operated on in synchronous discrete-time "chunks," such as a video frame, rather than being operated on asynchronously in continuous-time. This requires the use of a global clock which further limits the use of an ANN.

As an example, a dynamic vision sensor (DVS), which operates asynchronously to capture video data, may transmit only the local pixel-level changes caused by movement in a scene instead of outputting entire images at fixed frame rates. The output of a DVS is referred to as an address-event representation (AER). While this type of sensor is efficient in capturing video, the asynchronous AER output is not easily interpreted by a synchronous ANN.

In view of the example above, it would be desirable to address the inefficient re-computations of traditional ANNs required to interpret a sequence of related inputs. It would also be desirable to address the difficulty of traditional ANNs in interpreting data captured by sensors that produce an AER output.

BRIEF DESCRIPTION OF THE DRAWINGS

The elements in the figures may not be drawn to scale. Some elements and/or dimensions may be enlarged or minimized, as appropriate, to provide or reduce emphasis and/or further detail.

DETAILED DESCRIPTION OF VARIOUS EMBODIMENTS

Figure 1:
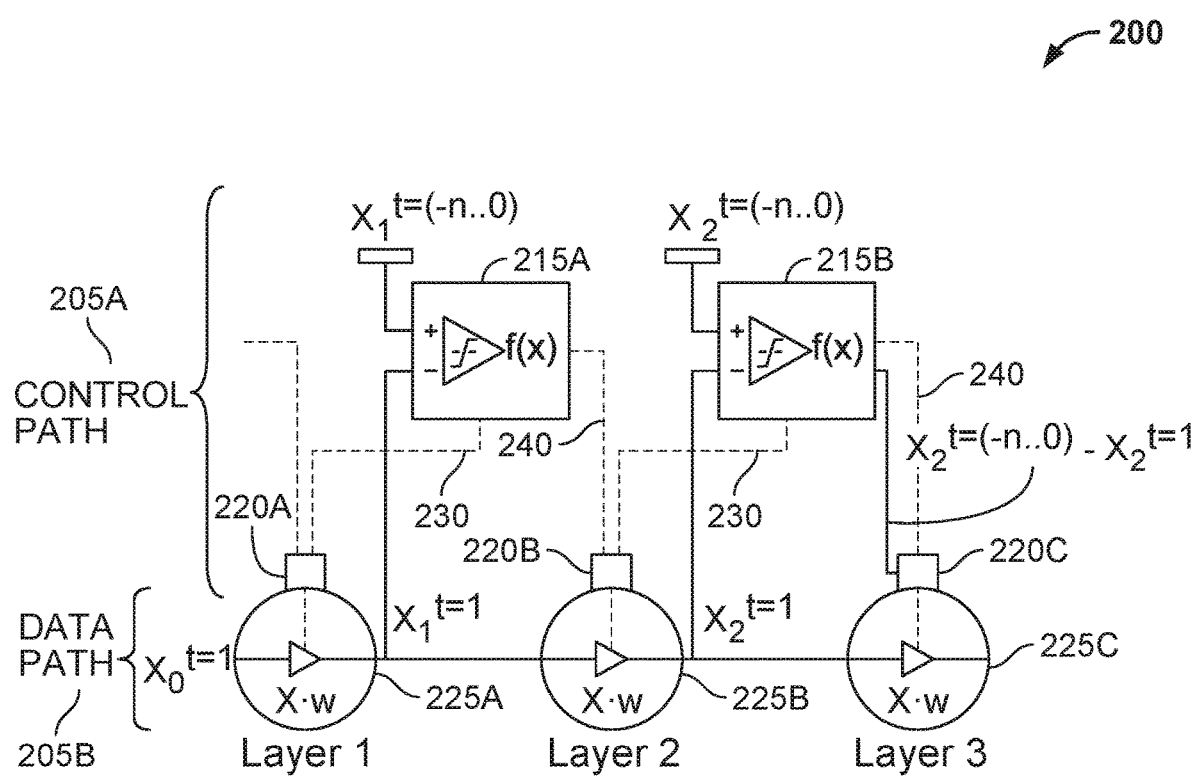
FIG. 1 illustrates an embodiment of an architecture including a multilayer asynchronous convolutional neural network.

References in the present disclosure to "one embodiment" or "an embodiment" means that a particular element, feature, structure, or characteristic described in connection with the embodiments is included in at least one embodiment. The appearances of the phrases "in one embodiment," "in some embodiments," and "in other embodiments" in various places in the present disclosure are not necessarily all referring to the same embodiment or the same set of embodiments.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of "the," "a," or "an" are employed to describe elements and components of the embodiments herein; this is done merely for grammatical reasons and to conform to idiomatic English. This detailed description should be read to include one or at least one, and the singular also includes the plural unless it is clearly meant otherwise. Also, depending on the context, the present disclosure may utilize the words "produce," "send," and "transmit" interchangeably (as well as their conjugates); the words "consume," "receive," and "utilize" may also be used interchangeably (as well as their conjugates); and the word "neuron" may be used interchangeably with "neuron layer."

According to illustrative embodiments, a convolutional artificial neural network (CNN) may interpret input data representing samples of sensory input data by performing asynchronous and partial computations in response to significant changes between samples. Instead of performing computations on the input data at every neuron layer in the CNN for every sample, as required in traditional synchronous ANNs, computations may only be performed by neuron layers in response to a significant change between samples. This can result in savings of time, energy, and memory required to perform calculations.

The subject matter of the present disclosure may take advantage of the fact that a sequence of input data, such as sensory input data, is often composed of related and similar samples with data that does not significantly change between samples. For example, consider a sequence of video frames which depict a subject walking with a relatively static background. A traditional synchronous ANN would require that calculations be performed by each neuron for each video frame, even for video frames that only include insignificant changes in the background or in the subject's movement.

According to some embodiments, neurons may only perform computations when there is a significant change between video frames, such as a significant movement by the subject. Calculations already performed by neurons may be reused if there is no significant change between the samples. For samples that experience changes, even partially, computations may be performed in an incremental and asynchronous manner.

FIG. 1 illustrates an example configuration of an architecture/system 200 including a multilayer asynchronous CNN according to one embodiment. The connections shown in FIG. 1 may be hardwired connections with the dotted lines representing control signal lines and the solid lines representing data signal lines.

Architecture/system 200 includes a CNN having multiple neuron layers referred to as Layer 1, Layer 2, and Layer 3. Each layer contains a computational unit (CU). For the purposes of this disclosure, a CU refers to a single application of a neuron's shared weights at a particular input location that produces a single output activation. A neuron layer may include several weights, with each CU in a neuron layer having a particular assigned weight.

Referring to FIG. 1, Layer 1 contains a computational unit 225A, Layer 2 contains a CU 225B, and Layer 3 contains a CU 225C. CU 225A may be considered a source CU, and CU 225C may be considered a sink CU. CU 225B may be considered a sink CU with respect to CU 225A and a source CU with respect to CU 225C. Layers 1, 2, and 3 of the CNN depicted in FIG. 1 make up a data path 205B.

Each source CU is configured to receive a source input value representing a sample of the sequence of input data and compute a dot product of the source input value and a weight assigned to the source CU to produce an activation value. Each sink CU, included in a layer of the CNN that is subsequent to the layer in which the source CU is included, is configured to receive a sink input value corresponding to an activation value computed by the source CU, responsive to a change detector (CD) associated with the source CU determining that the activation value output from the source CU is significantly different from previously computed activation values. Alternatively, each sink CU may be configured to receive a sink input value corresponding to the difference between the activation value output from the source CU and the previous activation values from the CD associated with the source CU, responsive to the CD determining that the difference is significant.

A control path 205A may be inserted into architecture 200 to manage the flow of data between the CUs 225A, 225B, and 225C. Control path 205A may dictate when a CU will perform computations on input data, with the time of computation being asynchronous to any other computation in the CNN. As shown in FIG. 1, control path 205A includes CDs 215A and 215B, as well as controllers 220A, 220B, and 220C, which are described in further detail below.

The computation performed by a CU includes a dot product of an input value X by a weight w assigned to the CU. This computation is depicted in FIG. 1 as a function X·w. The input value X may be a matrix representing a sample of a sequence of input data. For example, for a sequence of video data, the input X may be a matrix of pixel values. The weight w may also be in the form of a matrix. Thus, the dot product computation includes multiplications and a summation. For example, for a 3×3 input X and a 3×3 weight w, the dot product includes nine (9) multiplications followed by eight (8) summations.

The activation output computed by a source CU, such as CU 225A, is received by a sink CU, such as CU 225B, via control path 205A. As shown in FIG. 1, the input to the CNN at a current time t=1 is depicted as $X_0^{t=1}$, and the activation outputs of CUs 225A and 225B are depicted as outputs $X_1^{t=1}$ and $X_2^{t=1}$, respectively. A computed output from CU 225C is omitted in the interest of simplicity of illustration.

Each layer of the CNN includes a corresponding CU associated with a corresponding CD. As noted above, CDs are included in control path 205A. Each CD is used to monitor the activation value computed by an associated CU to determine whether there is a significant change in the activation value in comparison to previous activation values computed by the CU. As depicted in FIG. 1, a CD 215A is associated with a CU 225A, and a CD 215B is associated with a CU 225B. Each CD determines whether an associated CU's activation value output has changed significantly, such that the activation value output from that CU may be passed to a CU in the next subsequent layer.

Each CD may include non-transitory memory for storing previous activation values of an associated CU. For example, for the CD 215A, previous activation values $X_1^{t=(-n \ldots 0)}$ output by CU 225A are stored by CD 215A. For the CD 215B, previous activation values $X_2^{t=(-n \ldots 0)}$ output by CU 225B are stored by CD 215B.

Each CD also includes logic (such as a comparator, not labeled) for comparing an activation value output by its associated CU to previously stored activation values output by the CU in response to an output event signal from the CU. If the difference between the activation value output from the CU and the previously stored activation values is significant, e.g., if it meets or exceeds a predetermined threshold value that is stored in the CD, this indicates that there is a significant change between samples of the sequence of input data. Based on this significant difference, the CD issues a request signal to the subsequent CU requesting that the subsequent CU consume the activation value of the previous CU. For the purposes of this disclosure, the "subsequent CU" may be considered a CU in the next subsequent layer of the CNN.

For example, when CU 225A computes an activation value $X_1^{t=1}$, a controller 220A associated with CU 225A sends an output event signal via control signal line 230 to CD 215A. The output event signal may be considered a request signal initiating a handshake protocol with controller 220B associated with CU 225B. Also, CU 225A sends the computed activation value $X_1^{t=1}$ to CD 215A, which then calculates a difference between the activation value $X_1^{t=1}$ and the previously stored values $X_1^{t=(-n, 0)}$. The difference may be compared to a threshold stored in CD 215A.

If the difference calculated by CD 215A is determined not to be significant, e.g., if the difference does not meet or exceed the threshold, an acknowledgement signal is immediately returned to controller 220A via control signal line 230, indicating that controller 220A may discard its computed activation value $X_1^{t=1}$. This acknowledgement signal is not an indication that the activation value $X_1^{t=1}$ has been consumed by CU 225B. Rather, in this scenario, the activation value $X_1^{t=1}$ will not be used in a computation downstream by CU 225B but will simply be ignored.

If the difference calculated by CD 215A is determined to be significant, e.g., if it reaches or exceeds a threshold, then CD 215A sends a request signal via control signal line 240 to a controller 220B associated with the subsequent CU 225B, requesting that CU 225B consume the computed activation value $X_1^{t=1}$. The request signal may be in the form of a voltage signal which causes controller 220B to change the state of gating logic included in CU 225B as appropriate to be able to receive the activation value $X_1^{t=1}$ from CU 225A. In this manner, controller 220B instructs CU 225B to consume the activation value $X_1^{t=1}$. In response, CU 225B consumes the activation value $X_1^{t=1}$ output from CU 225A by using it in a calculation of a new activation value $X_2^{t=1}$.

Controller 220B acknowledges consumption of the activation value $X_1^{t=1}$ by sending an acknowledgement signal to CD 215A. The acknowledgement signal may be in the form of a voltage signal. CD 215A then sends an acknowledgement signal to controller 220A associated with CU 225A, indicating that the activation value $X_1^{t=1}$ computed by CU 225A has been consumed downstream.

After CU 225B has computed an activation value $X_2^{t=1}$ using the activation value $X_1 t=^1$ as an input value, CU 225B sends an output event signal via control signal line 230 to CD 215B, which then performs operations similar to CD 215A. CD 215B determines whether there is a significant difference between the activation value $X_2^{t=1}$ and previously computed activation values $X_2^{t=(-n, \, 0)}$ and sends an immediate acknowledgement signal to controller 220B via control signal line 230 or a request signal to controller 220C via control signal line 240 associated with CU 225C, as appropriate.

Responsive to an immediate acknowledgement signal being sent by CD 215B, computations stop, and the activation value $X_2^{t=1}$ is ignored. Responsive to the request signal being sent by CD 215B, controller 220C associated with CU 225C causes CU 225C to consume the activation value $X_2^{t=1}$ from CU 225B. Controller 220C acknowledges consumption of the activation value $X_2^{t=1}$ by sending an acknowledgement signal to CD 215B via control signal line 240, e.g., as a voltage signal. CD 215B then sends an acknowledgement signal to controller 220B via control signal line 230, indicating that the activation value $X_2^{t=1}$ computed by the CU 225B has been consumed.

As can be understood from the description above, a request signal may be sent from a CD associated with a CU to a controller associated with a subsequent CU if there is a significant difference between an activation value and previous activation values. If no request signal is received, the subsequent CU's gating logic does not change state, and no dynamic power is used. Thus, sending the request signal from a CD to the controller associated with a subsequent CU when there is a significant difference between an activation value and previous activation values conserves power.

In the embodiment described above, the activation value computed by a CU is consumed by a subsequent CU in a subsequent layer of the CNN if a CD determines that there is a significant difference between the activation value and previous activation values computed by that CU. In other embodiments, an data signal including only the difference between an activation value computed by a CU and previous activation values computed by that CU may be sent from a CD to a subsequent CU, rather than having that subsequent CU consume the entire activation value.

Referring to FIG. 1, this data signal is shown as data $X_2^{t=(-n \, \cdots \, 0)} - X_2^{t=1}$ output from CD 215B to CU 225C, the data signal includes the difference between the activation value $X_2^{t=1}$ and previous activation values $X_2^{t=(-n \, \cdots \, 0)}$ computed by CU 225B. Although not shown for simplicity of illustration, it should be appreciated that a similar data signal may be supplied from CD 215A to CU 225B.

Sending the aforementioned data signal to a subsequent CU in subsequent layer of the CNN enables efficient incremental calculation of the new activation value by the subsequent CU. The subsequent CU does not need to store partial sums and products. It can efficiently compute a new activation value with a single multiply operation and a single addition operation. That is, the subsequent CU multiplies the difference between the activation value and the previous activation values of a CU by the weight assigned to the subsequent CU and adds the product to the previous activation value to produce a new activation value.

While incremental calculation by a CU is more efficient than a complete recalculation, a series of many input values and incremental calculations may produce output values that are different enough from a complete re-calculation to be considered erroneous. This source of error can be mitigated by periodically performing the complete re-calculation using the entire activation value.

In the architecture shown in FIG. 1, each layer of the CNN in the data path 205B includes only one CU. However, one or more layers of the CNN may include multiple parallel CUs, as shown in FIG. 2.

Figure 2:
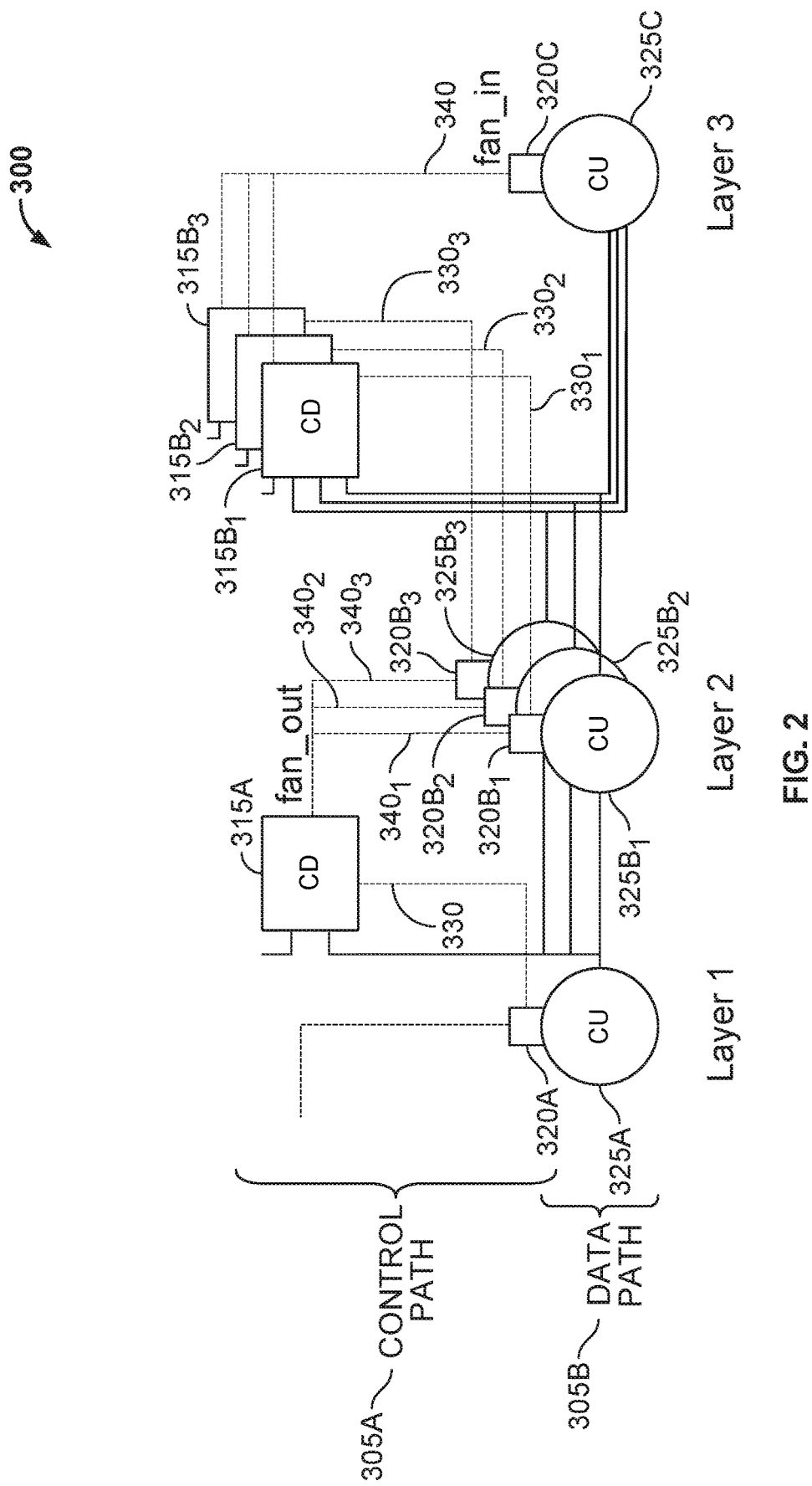
FIG. 2 illustrates an embodiment of an architecture including a multilayer asynchronous convolutional neural network having multiple computational units within a layer.

FIG. 2 illustrates an example of a system/architecture 300 including a multilayer asynchronous CNN having multiple CUs in a layer. The connections shown in FIG. 2 may be hardwired connections, with the dotted lines representing control signal lines, and the solid lines representing data signal lines.

As in the architecture shown in FIG. 1, the architecture shown in FIG. 2 includes a control path 305A and a data path 305B. Data path 305B includes multiple neuron layers, Layer 1, Layer 2, and Layer 3. Layers 1 and 3 include CUs 325A and 325C, respectively. Layer 2 includes multiple parallel CUs 325B$_1$, 325B$_2$, and 325B$_3$. Each of the CUs 325B$_1$, 325B$_2$, and 325B$_3$ are assigned different weights. CU 325A may be considered a source CU, and CU 325C may be considered a sink CU. CUs 325B$_1$, 325B$_2$, and 325B$_3$ may be considered sink CUs with respect to CU 225A and source CUs with respect to CU 225C.

Control path 305A depicted in FIG. 2 includes a CD 315A and a controller 320A associated with CU 325A in Layer 1. CD 315A acts as an asynchronous fork to control fan_out of the activation value from CU 325A in Layer 1 to CUs 325B$_1$, 325B$_2$, and 325B$_3$ in Layer 2. Control path 305A also includes controllers 320B$_1$, 320B$_2$, and 320B$_3$ and CDs 315B$_1$, 315B$_2$, and 315B$_3$ respectively associated with CUs 325B$_1$, 325B$_2$, and 325B$_3$ in Layer 2. Additionally, control path 305A includes a controller 320C associated with CU 325C in Layer 3. CDs 315B$_1$, 315B$_2$, and 315B$_3$ and controller 320C manage the fan_in from the multiple CUs 325B$_1$, 325B$_2$, and 325B$_3$ in Layer 2 to CU 325C in Layer 3.

Although FIG. 2 does not include labels for data signals, operations of the CUs and the gating logic of the CUs for the sake of simplifying the illustration, each of the CUs depicted in FIG. 2 computes dot products of input values with assigned weights to produce activation values in keeping with the above description of FIG. 1. Also, each CU depicted in FIG. 2 includes gating logic in keeping with the CUs depicted in FIG. 1.

Further, as in FIG. 1, each of the CDs depicted in FIG. 2 determines whether there is a significant difference between the activation values computed by their respective associated CUs and previous stored activation values and sends request signals to one or more subsequent CUs in the event that there is a significant difference. However, the timing at which such requests are sent may be controlled depending on whether the CD is managing fan_out or fan_in.

With regard to fan_in, when CU 325A calculates an activation value, controller 320A associated with CU 325A sends an output event signal to the CD 315A via control signal line 330. Also, CU 325A sends the computed activation value to CD 315A, which then calculates a difference between the computed activation value and the previous activation values computed by CU 325A and stored in CD 315A. The CD 315A determines whether the difference is significant, e.g., by comparing the difference to a threshold stored in CD 315A.

If the difference computed by CD 315A is determined not to be significant, an acknowledgement signal is immediately returned to the controller 320A via control signal line 330, and the activation value produced by CU 325A is not used in a calculation downstream.

If the difference calculated by CD 315A is determined to be significant, CD 315A sends request signals via control signal lines 340$_1$, 340$_2$, and 340$_3$ to controllers 320B$_1$, 320B$_2$, and 320B$_3$, respectively. The request signals request that CUs 325B$_1$, 325B$_2$, and 325B$_3$ consume the computed activation value from CU 325A, and controllers 320B$_1$, $320B_2$, and $320B_3$ respectively instruct CUs $325B_1$, $325B_2$, and $325B_3$ to consume the activation value from CU 325A in a manner similar to that described above with reference to FIG. 1. CUs $325B_1$, $325B_2$, and $325B_3$ consume the activation value output from CU 325A by using it in calculations of new activation values. In this manner, CD 315A and controllers $320B_1$, $320B_2$, and $320B_3$ control fan_out of the activation value from CU 325A to CUs $325B_1$, $325B_2$, and $325B_3$.

Controllers $320B_1$, $320B_2$, and $320B_3$ acknowledge consumption of the activation value by sending respective acknowledgement signals to CD 315A. The acknowledgement signals may be similar to the acknowledgement signal provided by the CUs described above with reference to FIG. 1. CD 315A then sends an acknowledgement signal to controller 320A associated with CU 325A, indicating that the activation value computed by CU 325A has been consumed downstream.

With regard to fan_in, after CUs $325B_1$, $325B_2$, and $325B_3$ have computed activation values using the activation value from CU 325A as an input value, CUs $325B_1$, $325B_2$, and $325B_3$ send output event signals via control signal lines $330_1$, $330_2$, and $330_3$ to the associated CDs $315B_1$, $315B_2$, and $315B_3$, respectively. CDs $315B_1$, $315B_2$, and $315B_3$ determine whether there is a significant difference between the activation values output from the respective associated CUs $325B_1$, $325B_2$, and $325B_3$ and previous computed activation values, and send immediate acknowledgement signals to controllers $320B_1$, $320B_2$, and $320B_3$ if the difference is not determined to be significant.

If any of the CDs $315B_1$, $315B_2$, and $315B_3$ determine that there is a significant difference, then the determining CD sends a request signal to controller 320C associated with CU 325C. The request signals from CDs $315B_1$, $315B_2$, and $315B_3$ are sent via control signal line 340 in FIG. 2. Responsive to the request signal, controller 320C causes CU 325C in Layer 3 to consume the activation values from one or more of CUs $325B_1$, $325B_2$, and $325B_3$ in Layer 2. The manner in which controller 320C causes CU 325C to consume the activation values from one or more of CUs $325B_1$, $325B_2$, and $325B_3$ may be controlled in various ways, which are described below.

In some embodiments, controller 320 employs CU granularity to control how the activation values are consumed. According to this aspect, controller 320C has a single asynchronous control channel for receiving request signals from CDs $315B_1$, $315B_2$, and $315B_3$. Rather than waiting for request signals to be received from all the CDs before performing a computation, controller 320C causes CU 325C to perform a computation of a new activation value using the activation values produced by all of CUs $325B_1$, $325B_2$, and $325B_3$ when a request signal is received from any of CDs $315B_1$, $315B_2$, and $315B_3$. This requires a full set of dot product operations to be performed using each of the activation values output from CUs $325B_1$, $325B_2$, and $325B_3$, whether or not there has been a significant change in the activation values, i.e., whether or not there is a significant difference between the activation values and previously computed activation values. A summation of the dot product results is then performed. The dot product operations and summation are performed upon each receipt of a request signal from any of CDs $315B_1$, $315B_2$, and $315B_3$. Upon receipt of a subsequent request signal from a different one of CDs $315B_1$, $315B_2$, and $315B_3$, another set of dot product operations is performed and the result is summed.

In other embodiments, CU channel granularity may be employed to control how activation values are consumed. According to this aspect, controller 320C has a single asynchronous control channel for receiving request signals from CDs $315B_1$, $315B_2$, and $315B_3$. However, rather than performing dot product operations and summing the results of all the dot products every time a request is received from any of CDs $315B_1$, $315B_2$, and 315B3, controller 320C causes CU 325C to consider each of the activation values from CUs $325B_1$, $325B_2$, and $325B_3$ separately prior to summing the dot products to produce the new activation output value. This avoids recalculation of dot products every time a request is received from any of CDs $315B_1$, $315B_2$, and $315B_3$ if the activation values have not changed.

In other embodiments, operand granularity may be employed to control how the activation values are consumed. According to this aspect, controller 320C has multiple asynchronous control channels, each one dedicated to receiving a request from a respective one of CDs $315B_1$, $315B_2$, and $315B_3$ The activation values from CUs $325B_1$, $325B_2$, and $325B_3$ may be considered operands. Dot products and summation operations are only performed by CU 325C if there is a significant change in an activation value from one or more of CUs $325B_1$, $325B_2$, and $325B_3$, as indicated by a request signal received from one or more of the associated CDs $315B_1$, $315B_2$, and $315B_3$. If there is not a significant change in an activation value, no operation is performed on that activation value by CU 325C. The unchanged partial sums and dot products that were previously calculated by CU 325C using previous activation values may be reused to calculate an output by having CU 325C cache the unchanged partial sums and dot products.

Controller 320C acknowledges consumption of one or more of the activation values output by CUs $325B_1$, $325B_2$, and $325B_3$ by sending respective acknowledgement signals to the associated CDs $315B_1$, $315B_2$, and $315B_3$. The acknowledgement signals may be similar to the acknowledgement signal provided by the CUs described above with reference to FIG. 1. Responsive to receipt of the acknowledgement signals, CDs $315B_1$, $315B_2$, and $315B_3$ then send acknowledgement signals to respective controllers $320B_1$, $320B_2$, and $320B_3$, indicating that the activation values computed by CUs $325B_1$, $325B_2$, and $325B_3$ have been consumed.

As described above with reference to the architecture shown in FIG. 1, an optional data signal including the difference between an activation value computed by a CU and previous activation values computed by that CU may be sent from a CD to a subsequent CU, rather than having that subsequent CU consume the entire activation value. As described above, sending only data including the difference to a subsequent CU in a subsequent layer of the CNN enables efficient incremental calculation of the new activation value by the subsequent CU. The subsequent CU does not need to store partial sums and products. To mitigate any errors caused by incremental calculations, complete recalculations may be periodically performed.

It should be appreciated that although both the architectures shown in FIGS. 1 and 2 include three layers, the number of layers in asynchronous CNN may include any number of layers.

In some embodiments, the asynchronous CNN architectures described above may be implemented in hardware, such as an Application Specific Integrated Circuit (ASIC) or a Field Programmable Gate Array (FPGA). Alternatively, the architectures may be implemented by a computing device including a processor executing instructions stored in a nontransitory computer-readable medium for performing the tasks of the various components shown in FIGS. 1 and 2.

Figure 3:
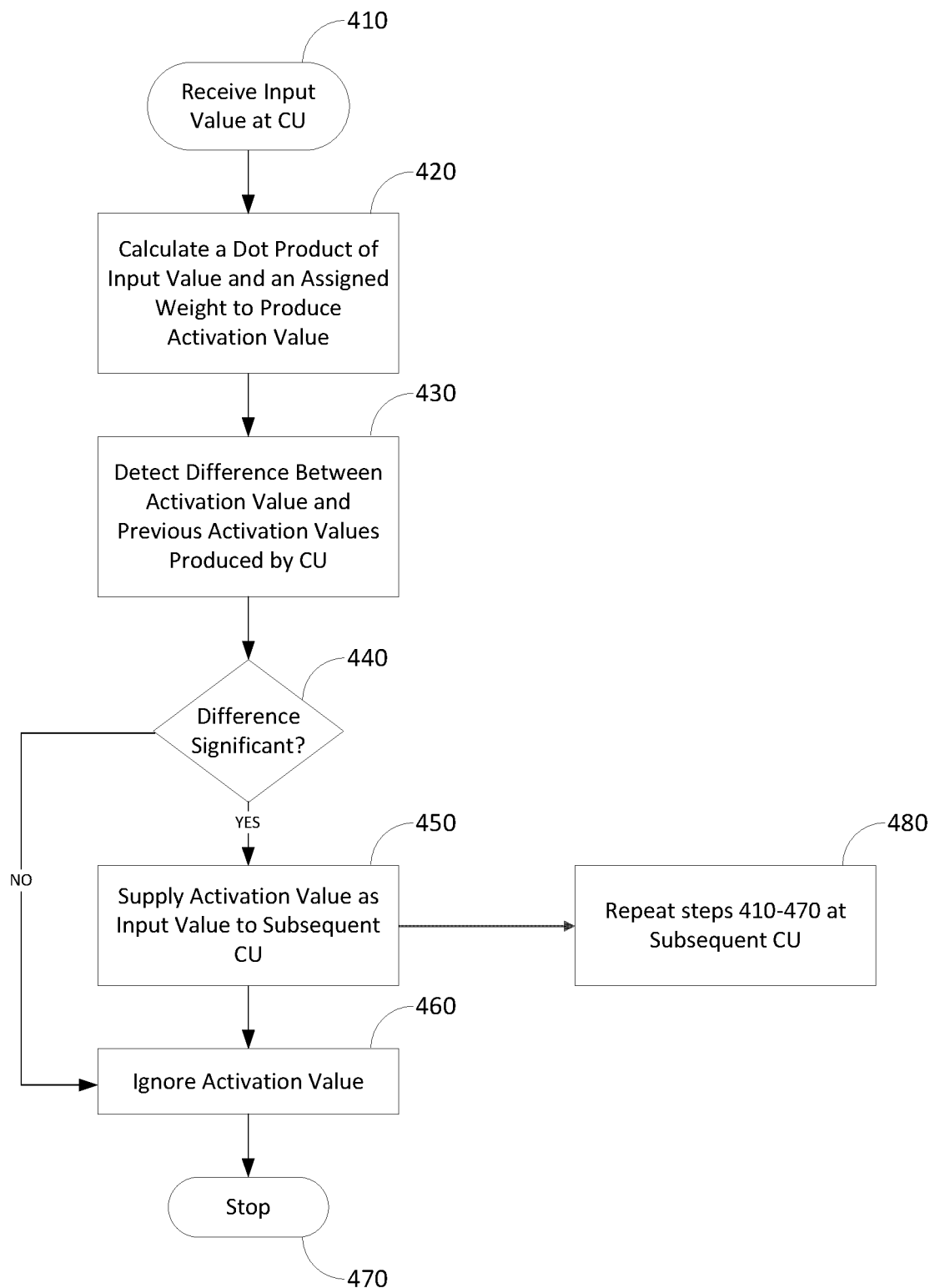
FIG. 3 is a flowchart showing an embodiment of a process for interpreting a sequence of input data using an asynchronous convolutional neural network.

FIG. 3 is a flowchart showing steps in a process 400 for interpreting a sequence of input data. Process 400 may be implemented as a series of modules, and the modules may function in concert with physical electronic and computer hardware devices. Such modules may be utilized separately and/or together, locally and/or remotely, to form a program product thereof, which may be implemented through recordable media. Various steps of process 400 may be stored within a non-transitory computer-readable medium, wherein the steps may be represented by computer-readable programming code.

For illustrative purposes, process 400 will be discussed with reference FIG. 3 and various other figures. Additionally, while FIG. 3 shows an embodiment of process 400, other embodiments of process 400 may contain fewer or more steps. Although in some embodiments the steps of process 400 may be performed as shown in FIG. 3, in other embodiments the steps may be performed in a different order, or certain steps may occur simultaneously with one or more other steps.

Referring to FIG. 3, process 400 begins at step 410 at which an input value representing a sample of a sequence of input data is received by a CU in a layer of an asynchronous CNN. The input value may be in the form of a matrix. At step 420, the CU calculates a dot product of the input value and a weight assigned to the CU to produce an activation value. At step 430, a CD associated with the CU detects a difference between the activation value and previous activation values produced by the CU.

At step 440, the CD determines whether the detected difference is significant, indicating that that the sample of the sequence of input data includes a significant change compared to previously received samples. This determination may be made by comparing the calculated difference between the activation value and previous activation values produced by the CU to a predetermined threshold. The calculated difference may be determined to be significant if it meets or exceeds the threshold.

If the detected difference is determined to be significant, the process proceeds to step 450 at which the activation value is supplied to at least one subsequent CU included in at least one subsequent layer of the CNN. The activation value may be supplied as an incremental value by the CD. That is, the CD may supply the difference between the activation value and previous activation values calculated by the CU. As shown at step 480, the process will repeat for each layer of the CNN for which an input value is received.

If, at step 440, the CD determines that the detected difference is not significant, the process proceeds to step 460 at which the activation value calculated by the CU is ignored, and no further calculations will be performed using that activation value. The process then stops at step 470. Although not shown, it should be appreciated that the process will be repeated when a new input value representing a new sample of the sequence of input data is received.

The embodiments described above may be applicable to any sequence of input data that includes related and similar samples. As noted above, sequences of input data may include sensory data, e.g., frames of video data captured by a camera. In this example, the significant change in the sample of the sequence of input data includes a significant change in pixels of a frame compared to corresponding pixels of frames in previously received samples of the sequence of input data. The significant change may include meeting or exceeding a predetermined threshold for changes in pixels of corresponding frames.

Those skilled in the art will appreciate that an output of the asynchronous CNN architecture and process described above may be used to classify the output data. As one example, the asynchronous CNN architecture may be used in conjunction with a softmax for detecting and classifying objects in a sequence of video frames. The output of the softmax may be an object label (dog, cat, bird, etc.) assigned to a subset of pixels of the input video frames.

Consider, for example, a surveillance camera pointed at the sky. The pixels in the video frames captured by the camera do not change very much or very often. The camera captures mostly the background of the sky, with some clouds that change slowly. From time to time, the camera may capture pixels of an object in the sky, such as a bird or a small unmanned aerial vehicle (UAV) or drone. The asynchronous CNN architecture and process described above may be used to interpret the video frames of the sky captured by the camera. The asynchronous CNN architecture allows for higher speed and lower power operation during interpretation of each video frame compared to traditional ANNs by only performing operations on input data representing the pixels of the video frame that change in value. Thus, the asynchronous CNN architecture implemented in an integrated circuit could discern a bird from a UAV or drone, operating on batteries for far longer than traditional software running on a computer including a graphics processing unit (GPU) or a central processing unit (CPU) could run. Operating in conjunction with a softmax, an output may be provided labeling the object as a bird or a drone.

The CNN architecture and process described above asynchronously interpret a sequence of input data with the option of using incremental calculations at each CU rather than using full calculations. This is advantageous compared to traditional synchronous architectures and methods because the redundant re-calculation of very similar activation values is largely eliminated. An implementation with asynchronous circuits also enables true event-driven inputs to be processed without the use of discrete time-steps.

The asynchronous CNN architecture and process described above may be used in conjunction with other approaches for interpreting a sequence of input data. Some of these approaches may include event-based spiking artificial neural networks (SNNs) and model compression.

Model compression refers to various techniques for reducing the computation required in an ANN in feedforward mode, potentially at a sacrifice of efficacy. Examples of model compression include network pruning, quantization of weight values, and compression of weight values through coding.

SNNs and model compression may be used in addition to the asynchronous convolutional neural network architecture described above.

The use of any examples, or exemplary language ("e.g.," "such as," etc.), provided herein is merely intended to better illuminate and is not intended to pose a limitation on the scope of the subject matter unless otherwise claimed. No language in the present disclosure should be construed as indicating that any non-claimed element is essential.

Many modifications and variations of the present disclosure are possible in light of the above description. Within the scope of the appended claims, the embodiments described herein may be practiced otherwise than as specifically described. The scope of the claims is not limited to the disclosed implementations and embodiments but extends to other implementations and embodiments as may be contemplated by those having ordinary skill in the art.

What is claimed is:

1. A method for interpreting a sequence of input data, comprising:
receiving, by a computational unit (CU) in a layer of an asynchronous convolutional neural network (CNN), an input value representing a sample of the sequence of input data, wherein the CU is configured as a single application of shared weights of a neuron at an input location that produces a single output activation;
calculating, by the CU, a dot product of the input value and a weight assigned to the CU to produce an activation value;
detecting, by a change detector (CD), a difference between the activation value and previous activation values produced by the CU, wherein the CD includes memory for storing the previous activation values produced by the CU;
determining, by the CD, whether the detected difference is significant such that it meets or exceeds a predetermined threshold, wherein the significant detected difference between the activation value and the previous activation values indicates that the sample of the sequence of input data includes a significant change compared to previously received samples of the sequence of input data; and
supplying, by the CD, when the detected difference is significant, the activation value to at least one subsequent CU included in a subsequent layer of the asynchronous CNN for interpreting the sequence of input data.

2. The method of claim 1, wherein when the detected difference is not significant, the activation value is ignored and not supplied to the at least one subsequent CU, such that only significant changes in samples of the sequence of input data are used to interpret the sequence of input data.

3. The method of claim 1, wherein the supplying step further comprises supplying the difference between the activation value and the previous activation values as an input value to the at least one subsequent CU.

4. The method of claim 3, wherein each layer of the neural network includes a corresponding CU associated with a corresponding CD, and the method steps are repeated for each layer for which an input value is received.

5. The method of claim 1, wherein the supplying step further comprises, when the detected difference is significant, sending an asynchronous request from the CD to a controller associated with the at least one subsequent CU requesting that the at least one subsequent CU consume the activation value.

6. The method of claim 5, further comprising:
instructing, by the controller, the at least one subsequent CU to consume the activation value responsive to receipt of the asynchronous request.

7. The method of claim 1, wherein the sequence of input data includes frames of video data, and the significant change in the sample of the sequence of input data includes a significant change in pixels of a frame compared to corresponding pixels in frames in previously received samples of the sequence of input data.

8. A device for interpreting a sequence of input data, comprising:
a source computational unit (CU) included in a layer of an asynchronous convolutional neural network (CNN), the source CU configured to receive a source input value representing a sample of the sequence of input data and compute a dot product of the source input value and a weight assigned to the source CU to produce an activation value, wherein the CU is configured as a single application of shared weights of a neuron at an input location that produces a single output activation;
a change detector (CD) associated with the source CU and including memory for storing activation values produced by the CU, the CD configured to:
calculate a difference between the activation value and previous activation values produced by the source CU for previously received samples of the input data; and
determine whether the difference is significant such that it meets or exceeds a predetermined threshold; and
at least one sink CU included in a subsequent layer of the asynchronous CNN, the at least one sink CU configured to receive a sink input value corresponding to the difference between the activation value and the previous activation values from the CD, responsive to the CD determining that the difference is significant.

9. The device of claim 8, wherein when the CD determines that the difference between the activation value and the previous activation values is not significant, the at least one sink CU does not receive the sink input value from the CD, such that only source activation values that correspond to input values representing significant differences between samples of the sequence of input data are used to interpret the sequence of input data.

10. The device of claim 8, wherein the sequence of input data includes frames of video data, and the significant change in the sample of the sequence of input data includes a significant change in pixels of a frame compared to corresponding pixels in frames in previously received samples of the sequence of input data.

11. The device of claim 8, wherein the CD is further configured to send an asynchronous request to a controller associated with the at least one sink CU, requesting that the at least one sink CU consume the sink input value corresponding to the difference between the activation value and the previous activation values responsive to the CD determining that the difference is significant.

12. The device of claim 11, wherein the controller associated with the at least one sink CU is configured to instruct the at least one sink CU to consume the difference responsive to receipt of the asynchronous request.

13. A system for asynchronously interpreting a sequence of sensory input data, comprising:
an asynchronous convolutional neural network (CNN) including multiple layers, each layer including:
a computational unit (CU) having an associated weight and being configured to compute a dot product of an input value corresponding to a sample of the sequence of sensory input data and the associated weight and provide an activation value, and the CU is also configured as a single application of shared weights of a neuron at an input location that produces a single output activation; and
a plurality of change detectors (CDs) each associated with the CU and including memory for storing activation values produced by the CU, wherein each CD is configured to determine whether a difference between the activation value and previous activation values produced by the respective associated CU is significant such that the difference meets or exceeds a predetermined threshold, and wherein, based on the significant difference, the CD causes the activation value to be used by a subsequent layer in the asynchronous CNN such that only activation values that correspond to input values representing significant differences between samples of the sequence of sensory input data are used to interpret the sequence of samples of sensory input data.

14. The system of claim 13, wherein each CD is further configured to send the difference between the activation value and the previous activation values to a subsequent CU included in a subsequent layer responsive to determining that the difference is significant.

15. The system of claim 14, wherein at least one layer includes multiple CUs each having an associated weight, and wherein each of the multiple CUs is associated with respective CDs.

16. The system of claim 13, wherein the sequence of sensory input data includes frames of video data, and the significant differences in the sample of the sequence of input data includes a significant change in pixels of a frame compared to corresponding pixels in frames in previously received samples of the sequence of input data.

17. The system of claim 15, wherein each respective CD is further configured to send the difference between the activation value and the previous activation values produced by the respective associated one of the multiple CUs to a subsequent CU included in a subsequent layer responsive to determining that the difference is significant.

18. The system of claim 17, further comprising a controller associated with the subsequent CU and configured to control receipt of the difference from each respective CD.

19. The system of claim 18, wherein each respective CD is configured to send an asynchronous request to the controller associated with the subsequent CU, requesting that the subsequent CU consume the difference, and wherein the controller includes an asynchronous control channel configured to receive each asynchronous request from each respective CD.

20. The system of claim 18, wherein each respective CD is configured to send an asynchronous request to the controller associated with the subsequent CU, requesting that the subsequent CU consume the difference, and wherein the controller has multiple asynchronous control channels, each asynchronous control channel associated with a respective CD and configured to receive the asynchronous request from the respective CD.

* * * * *